(12) United States Patent
Sukup et al.

(10) Patent No.: US 6,941,712 B2
(45) Date of Patent: Sep. 13, 2005

(54) MOUNTING BRACKET FOR GRAIN BIN

(75) Inventors: Steven E. Sukup, Dougherty, IA (US); John A. Hanig, Sheffield, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 321 days.

(21) Appl. No.: 10/262,267

(22) Filed: Oct. 1, 2002

(65) Prior Publication Data

US 2004/0060250 A1 Apr. 1, 2004

(51) Int. Cl.$^7$ ................................. E04B 1/38
(52) U.S. Cl. .................. 52/293.3; 52/295; 52/702; 52/714; 52/745.21; 52/741.14; 403/190; 403/232.1; 248/300
(58) Field of Search ............. 52/293.1, 293.3, 52/167.3, 192, 295, 702, 713–714, 481.1, 745.21, 741.14, 247; 403/232.1, 190, 403; 248/300

(56) References Cited

U.S. PATENT DOCUMENTS

| | | | | |
|---|---|---|---|---|
| 4,058,859 A | * | 11/1977 | Arrowood | 248/297.31 |
| 4,265,423 A | * | 5/1981 | Vecchiarelli | 248/264 |
| 4,744,192 A | * | 5/1988 | Commins | 52/714 |
| 4,825,621 A | * | 5/1989 | Jensen | 52/702 |
| 5,092,097 A | * | 3/1992 | Young | 52/702 |
| 5,979,130 A | * | 11/1999 | Gregg et al. | 52/295 |
| 6,006,487 A | * | 12/1999 | Leek | 52/698 |
| 6,112,495 A | * | 9/2000 | Gregg et al. | 52/712 |
| 6,250,041 B1 | * | 6/2001 | Seccombe | 52/712 |
| 6,609,849 B2 | * | 8/2003 | Kalm et al. | 403/91 |
| 6,719,481 B2 | * | 4/2004 | Hoffmann | 403/403 |

FOREIGN PATENT DOCUMENTS

JP 9-273249 * 10/1997

OTHER PUBLICATIONS

Grain Systems, Inc., "4.00" Corrugated Grain Bin Construction Manual—Jan. 17, 1994, Assumption, IL, USA.
Grain Systems, Inc., "2.66" Corrugated Grain Bin Construction Manual—Jan. 17, 1994, Assumption, IL, USA.
Global Industries, Inc., 2.66 Grain Bins)—Jul., 2002.
Brock, "Farm Grain Bin Construction Manual"—Aug., 1997.
Brock, "Construction Manual Popcorn Grain Bin"—Mar., 1999.
CTB Grain Systems, "Corrugated Grain Tank Assembly Manual"—Feb., 1997, Kansas City, MO USA.
GROWMARK, "Farm Grain Bin"—Jun., 1999.
Conrad American, "Installation Guide & Operator's Manual"—Mar., 1997—Sioux Falls, SD, USA.
SUPERIOR, "Erection Manual—Drying Bins and Storage Bins"—Jun., 1982.
York Manufacturing Company, "Erection Instructions—Grain Bins", Aug. 1, 1982.

* cited by examiner

*Primary Examiner*—Winnie Yip

(57) ABSTRACT

A mounting bracket having a vertical member with a back portion and side flanges where the back portion has a plurality of slots and holes and the side flanges have slots at both ends. Adjustably connected to the vertical member is a shoe with a bottom portion and side flanges that extend upwardly and are aligned with the side flanges of the vertical member. The shoe is positioned substantially perpendicular to the vertical member to form a generally L-shaped bracket.

5 Claims, 4 Drawing Sheets

MOUNTING BRACKET FOR GRAIN BIN

BACKGROUND OF INVENTION

This invention is directed toward a mounting bracket for structures and more particularly to mounting brackets for use with grain drying bins.

Mounting brackets are known in the art and are used to support the sidewalls of a grain bin and to connect the sidewalls to a concrete base. These brackets are primarily bolted to the sidewall of the bin along a vertical seam where the sidewall panels overlap, but may also be bolted to the sidewall in between seams. The brackets are typically of two types with one designed for placement upon a bin with a base angle on the bottom sheet and the other with a rolled flange on the bottom sheet. Thus, different brackets are needed for different grain bins.

In addition, brackets typically do not extend above the false floor of the bin and therefore provide little assistance in vertically supporting the bottom side panels of the grain bin when grain is added. The portion of the side panel between the false floor and the concrete base has the greatest load of the grain bin and is susceptible to crumpling on rare occasions.

Accordingly, a principle objective of this invention is to provide a mounting bracket that can be adapted for use with both a base angle and a rolled flange bottom sheet of a grain bin.

A further objective is to provide a mounting bracket that provides vertical support to the sidewall of a bin when grain is added.

A still further objective of this invention is to provide a mounting bracket that is easy to install and economical to manufacture.

These and other objectives will be apparent to one skilled in the art based on the following description.

SUMMARY OF THE INVENTION

The mounting bracket of this invention has a vertical member and a horizontal shoe. The vertical member has a back portion and side flanges that extend outwardly from the back portion. On the back portion are a plurality of spaced slots and holes. The holes receive bolts that connect the bracket to the sidewall of a drying bin, while the slots provide access to the bolts that connect the sidewall panels of the drying bin. At the opposite ends of the side flanges of the vertical member are slots. The horizontal shoe is positioned at one end of the vertical member to define the bottom end and extends generally perpendicular so as to create a substantially L-shaped bracket. The horizontal shoe has a bottom portion with vertical side flanges that fit within the side flanges of the vertical member. The bottom portion has a hole that receives a bolt that connects the shoe to a concrete base of a grain drying bin. The side flanges of the shoe have holes that are generally aligned with the slots of the side flanges of the vertical member. Bolts extend through the holes of the side flanges of the shoe and through the slots of the side flanges of the vertical member. The shoe can be moved upward or downward within the slots of the side flanges of the vertical member prior to tightening the bolts to adjust the height of the bracket.

DETAILED DESCRIPTION OF THE PREFERRED EMBODIMENT

Figure 1:
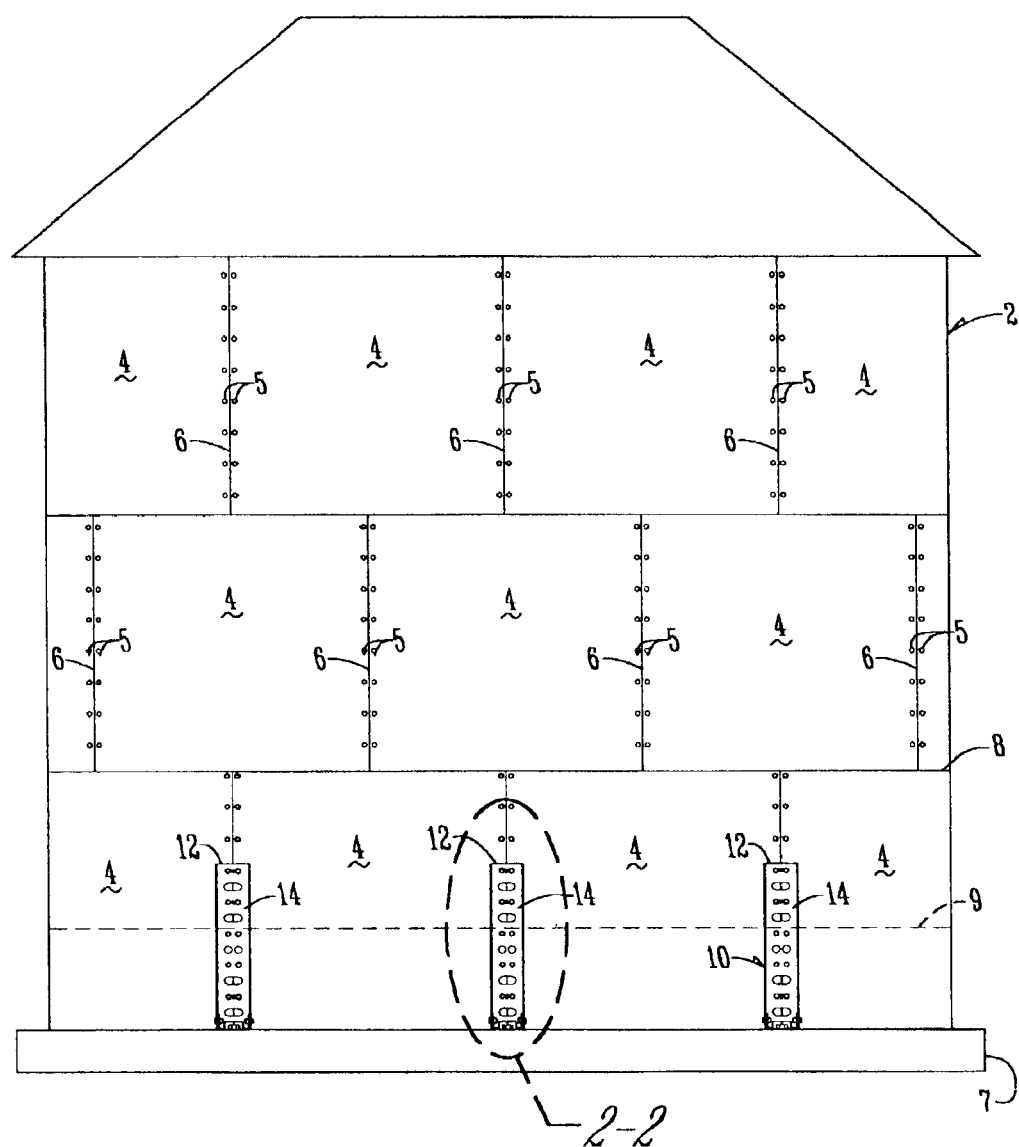
FIG. 1 is a side view of a grain bin with mounting brackets.

Referring to the drawings, the mounting bracket of this invention is referred to generally by reference number 10. The mounting bracket 10 is for use with a conventional grain drying bin 2 having a plurality of sidewall panels 4 that are bolted 5 together along a vertical seam 6 to form a bottom ring 8. The bin 2 sits upon a concrete slab 7 and within the bin above the concrete slab is a false floor 9.

The mounting bracket 10 has a vertical member 12 with a back portion 14 and two side flanges 16 that extend outwardly from the back portion. The vertical member is approximately 22 inches long and extends above the false floor 9 which is generally 12 to 18 inches above the concrete slab 7. The advantage of extending the bracket 12 above the false floor 9 of the bin 2 is that it provides additional vertical support for the bottom sidewall ring 8 of the grain bin when grain is stored in the bin.

Figure 2:
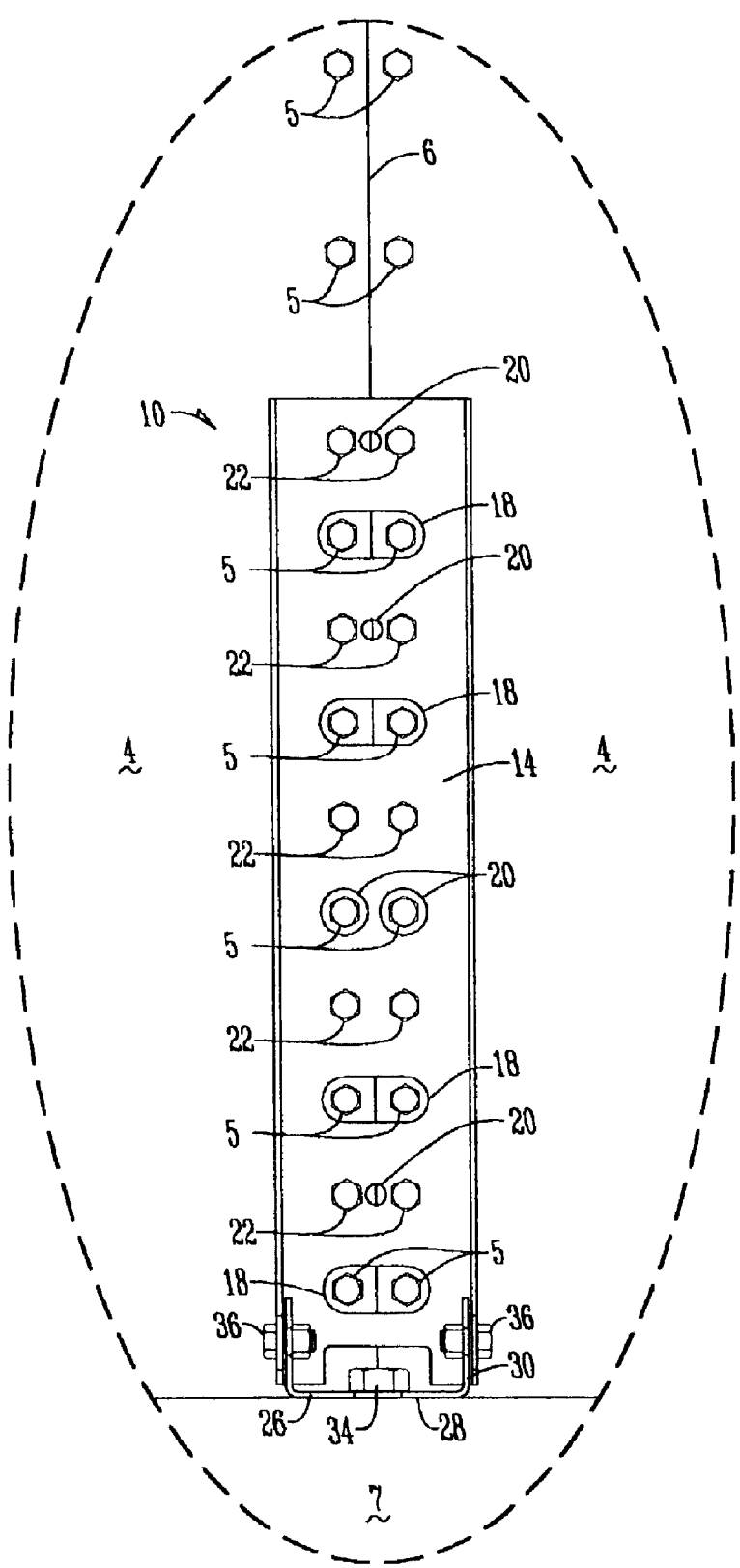
FIG. 2 is a view of the mounting bracket taken along line 2—2 of FIG. 1.
Figure 3:
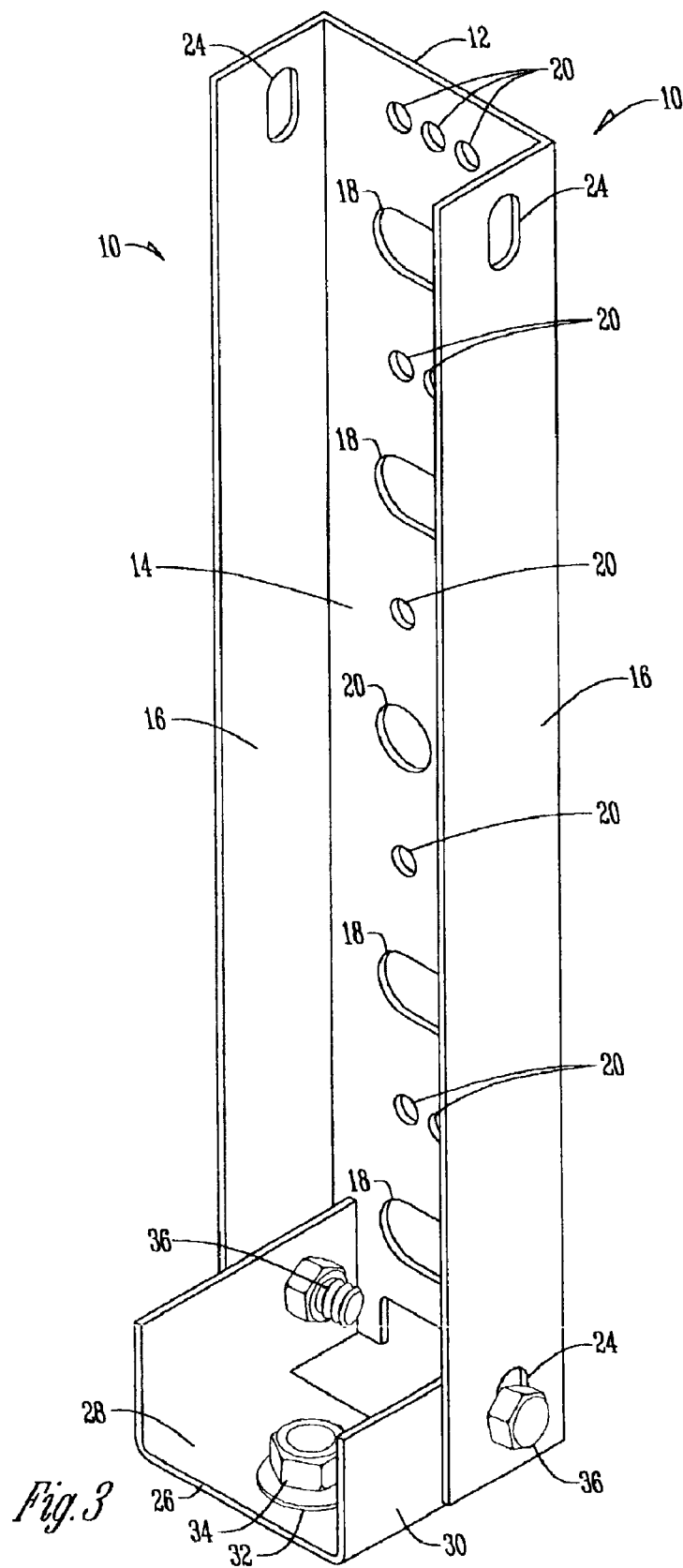
FIG. 3 is a perspective view of a mounting bracket.
Figure 4:
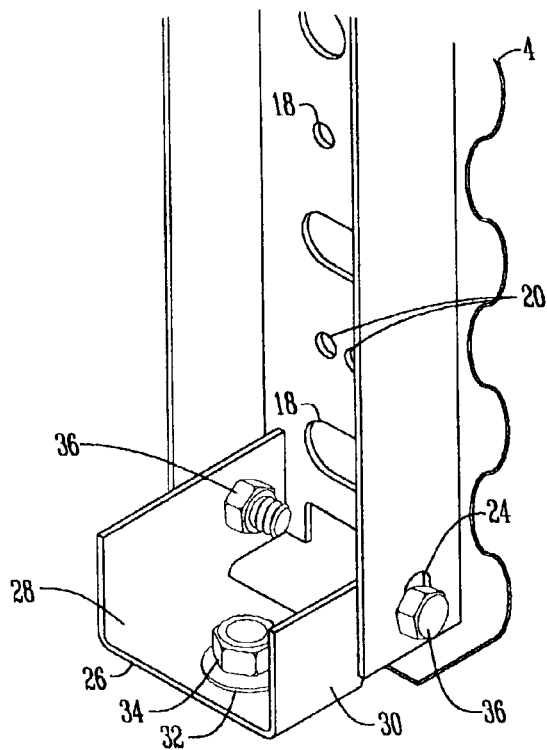
FIG. 4 is a perspective view of the mounting brackets attached to a bin with a rolled flange base.
Figure 5:
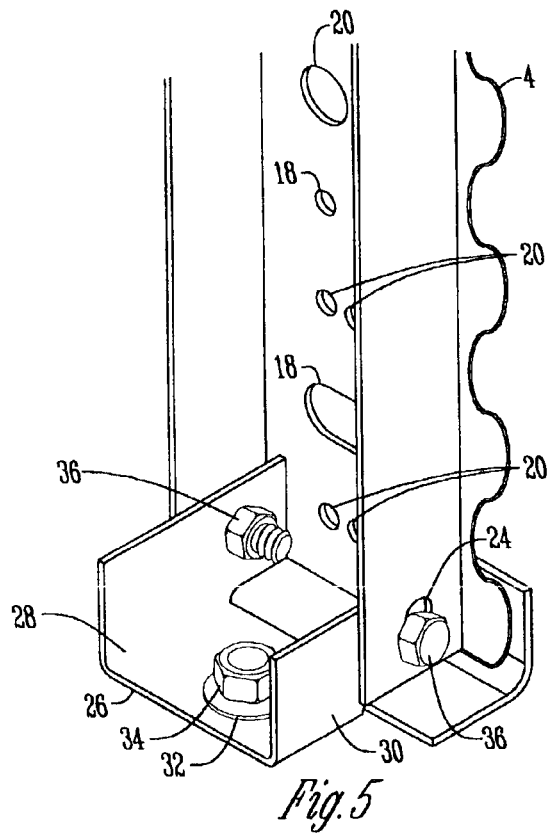
FIG. 5 is a perspective view of the mounting brackets attached to a bin with a base angle base.

The back portion 14 of the vertical member 12 has a plurality of slots 18 that are spaced to fit over bolts 5 that are used to connect the side panels 4 of the grain bin 2. While the slots 18 can be of any shape it is preferred that they are elliptical along a horizontal axis to allow some flexibility in fitting over the connecting bolts 5 of the bin 2. Also on the back portion 14 of the vertical member 12 are a plurality of holes 20 that receive bolts 22 for connecting the mounting bracket 10 to the bin 2. While a variety of hole 20 configurations can be used, it is preferred that a grouping of two or three circular holes 20 transversely spaced across the back portion 14 and the grouping repeated along the vertical member 12 as shown in FIG. 2. Also, it is preferred that a slot 18 be positioned at one end of the vertical member 12 and holes 20 be positioned at the opposite end of the vertical member with the holes and slots alternating therebetween along the vertical plane of the vertical member. The advantage of positioning a slot 18 and holes 20 at opposite ends is that the vertical member can be used with bins 2 that have different types of bottom panels 4. For example, the connecting point of a bottom panel bolted to a base angle is near the bottom end of the vertical member. Thus, to attach the bracket 10 to a panel 4 that is bolted to a base angle (see FIG. 5) the end of the vertical member 12 with the holes 20 at the end is positioned at the bottom end near the concrete base 7. Alternatively, a bottom panel with a rolled flange at the base has a connecting point that is higher than that of a base-angle. Thus, to attach the bracket 10 to a panel 4 with a rolled flange (see FIG. 4) the end of the vertical member 12 with the slot 18 at the end is positioned at the bottom end near the concrete base 7. Accordingly, by reversing the ends of vertical member 12, the bracket 10 can be adapted for use with different types of side panels 4.

Connected to the vertical member 12 is a horizontal shoe 26 such that the shoe extends generally perpendicular to the vertical member to form a substantially L-shaped bracket 10. The shoe 26 has a bottom portion 28 and side flanges 30 that extend upwardly from the bottom portion and fit within the side flanges 16 of the vertical member 12. The bottom portion has a hole 32 for receiving a bolt 34 that connects the shoe 26 to the concrete slab 7. The side flanges 30 have holes that receive bolts 36 that extend through the slots 24 in the side flanges 16 of the vertical member 12. While the slots 24 can be of any shape it is preferred that they be elliptical along a vertical axis to allow flexibility in moving the horizontal shoe 26 up or down in relation to the vertical member 12 to accommodate for dips or uneven areas in the concrete slab 7. The slots 24 also provide some flexibility for movement of the vertical member 12 when grain is added to and removed from the bin 2.

By using a two piece bracket with slots 18, the bracket 10 absorbs the vertical load from the sidewall 4 of the bin 2 and transfers the load to the bottom of the vertical member 12 on the concrete slab 7 rather than through the shoe 26. The shoe 26 is used to minimize the horizontal movement of the bottom ring 8 that occurs due to the variation in the load on the lower bin ring 8 when the bin 2 is filled and emptied. The combination of the slots 18 and holes 20 allows a minimum number of bolts 22 to be used to secure the bracket 10 to the bin 2 and makes installation of the brackets easier. The slots 18 aligned over the bolts 5 further minimizes the interference of the brackets when removing, repairing or replacing the side panels 4.

To assemble a bracket 10 to a bin 2 with a bolt angle base ring 8, the end with the holes 20 is at the bottom of the bracket or near the base. For a bin 2 with a flange roll base ring 8, the end with the slot 18 is placed near the base. The vertical member is attached to the ring 8 with bolts 22 through holes 20 such that slots 18 align over bolts 5, unless attached at mid-seam where there is no need to align the slots 18 over the bolts 5. The shoe 26 is attached to the vertical member 12 using bolts 36. The shoe 26 is then adjusted until it rests on the concrete slab 7 and then the shoe is connected to the slab using bolt 34. This minimizes the need for shims.

As can be seen from this description, this invention satisfies the objectives of providing a bracket that can be used interchangeably with both base angle and rolled flange panels and that assists in vertically supporting the bottom ring when the bin is filled with grain. Having thus described the invention it should be understood that numerous structural modifications and adaptations may be resorted to without departing from the spirit of the invention.

What is claimed:

1. A mounting bracket comprising:
   a vertical member having a back portion with first and second opposite ends, and side flanges that extend outwardly from the back portion, the back portion having a plurality of holes and horizontal elliptical slots positioned along the length of the back member and the side flanges having vertical adjusting slots at the ends of the side flanges wherein the first end of the back portion has a plurality of the holes and the second opposite end has one the horizontal elliptical slot; and
   a horizontal shoe extending substantially perpendicular to the vertical member and adjustably connected to the vertical member, the shoe having a bottom portion and side flanges that extend upwardly from the bottom portion and in alignment attach with the side flanges of the vertical member.

2. The mounting bracket of claim 1 wherein the horizontal elliptical slots and the holes on the back portion of the vertical member are alternatively positioned along the length of the back portion.

3. The mounting bracket of claim 1 wherein the shoe is connected to the vertical member by bolts that extend through the side flanges of the shoe and the slots of the side flanges of the vertical member.

4. A method of installing a mounting bracket on a structure having side panels, that rest upon a concrete base, comprising the steps of:
   selecting a vertical member having a back portion and side flanges that extend outwardly from the back portion, the back portion having a plurality of holes and horizontal elliptical slots openings that extend along the length of the back portion, and the side flanges having vertical adjusting slots at the ends of the side flanges wherein a plurality of the holes are positioned at one end of the vertical member and one the horizontal elliptical slot is positioned at the opposite end of the vertical member;
   connecting the vertical member to the side panels;
   connecting the vertical member to a shoe having a bottom portion and side flanges that align with the vertical adjusting slots of the side flanges of the vertical member;
   adjusting the shoe in relation to the vertical member so as to contact the base; and
   connecting the shoe to the base.

5. The method of claim 4 wherein the step of selecting a vertical member further comprises selecting a vertical member wherein the horizontal elliptical slots an the holes on the back portion of the vertical member are alternatively positioned along the length of the vertical portion.

* * * * *